(12) United States Patent
Pecastaing

(10) Patent No.: US 7,070,509 B2
(45) Date of Patent: Jul. 4, 2006

(54) TAP POSITION SENSOR WITH OFFSET DETECTION

(75) Inventor: Matthieu Pecastaing, Groisy (FR)

(73) Assignee: PRONIC, Marignier (FR)

( * ) Notice: Subject to any disclaimer, the term of this patent is extended or adjusted under 35 U.S.C. 154(b) by 179 days.

(21) Appl. No.: 10/872,668

(22) Filed: Jun. 21, 2004

(65) Prior Publication Data

US 2005/0003898 A1    Jan. 6, 2005

(30) Foreign Application Priority Data

Jul. 1, 2003 (FR) .................................. 03 08241

(51) Int. Cl.
*B21D 53/24* (2006.01)

(52) U.S. Cl. .............................. 470/96; 408/8; 33/638; 470/47

(58) Field of Classification Search .................. 470/96, 470/44, 45, 47; 408/8, 11; 33/832, 836, 33/638, 639
See application file for complete search history.

(56) References Cited

U.S. PATENT DOCUMENTS

| 2,689,363 | A | * | 9/1954 | Frye | 408/11 |
|---|---|---|---|---|---|
| 3,200,426 | A | * | 8/1965 | Barr | 408/9 |
| 3,870,430 | A | * | 3/1975 | Guenot | 408/6 |
| 3,994,612 | A | * | 11/1976 | Ducrohet | 408/1 R |
| 4,310,269 | A | * | 1/1982 | Neu et al. | 408/11 |
| 4,718,175 | A | * | 1/1988 | Babel | 33/626 |
| 5,086,590 | A | * | 2/1992 | Athanasiou | 451/5 |
| 5,615,471 | A |   | 4/1997 | Perazzolo |   |
| 5,967,008 | A |   | 10/1999 | Daniels |   |
| 6,665,948 | B1 | * | 12/2003 | Kozin et al. | 33/833 |

FOREIGN PATENT DOCUMENTS

DE          19729263 A1       1/1999

OTHER PUBLICATIONS

English-language abstract corresponding to DE-197 29 263 (cited on p. 1).

* cited by examiner

*Primary Examiner*—Ed Tolan
(74) *Attorney, Agent, or Firm*—William H. Eilberg

(57) ABSTRACT

In an integrated cutting and tapping tool, a part in the form of a strip is held on a strip support with a hole facing a tap carried by a tapping tool. The bottom dead center point of the tap is detected by a feeler associated with a multiplier lever pivoting about a transverse shaft and pulling on a transmission cable whose free end is detected by position detection means. In this way the position detection means may be moved out of the tool platen, so that the plunger and the multiplier lever constitute an assembly that is easy to integrate under the tapping area. The machining of defective tappings is detected in this way.

10 Claims, 6 Drawing Sheets

TAP POSITION SENSOR WITH OFFSET DETECTION

TECHNICAL FIELD OF THE INVENTION

The present invention relates to press tapping devices, in which a part such as a strip to be cut and tapped is held in a tool for forming and cutting the strip, which tool is also provided with at least one tapping tool.

These cutting and tapping tools are generally adapted to produce parts at a high throughput from continuous strip.

When tapping on a press, it is generally desirable to limit the travel of the taps to exactly that needed to obtain a thread of the correct size. Limiting the tapping stroke limits machining time, and increases throughput. A sensor may be used for this purpose that detects the end of the tapping operation, as suggested in U.S. Pat. No. 5,615,471 A.

The document DE 197 29 263 A1 discloses a press tapping unit comprising three sensors: a first sensor for detecting possible retrograde movement of the tap and its support; a second sensor for detecting displacement of the tap carrier spindle; a third sensor for detecting if the tapped hole is free or blocked by a broken tap.

However, it sometimes happens that the tapping is not completely performed: the tap does not pass completely through the material, and so the tapping is incomplete.

It has been found that these defects occur at random in a batch of parts, and that they are relatively difficult to detect.

Current requirements are oriented towards machining that is 100% reliable, i.e. machining that produces batches of tapped parts that are 100% satisfactory, meaning there is a total absence of defective parts in the batch.

This necessitates detecting the presence of a defective part as soon as it is machined, in order to prevent it ending up in the batch, which will then contain only correct parts. The devices described in U.S. Pat. No. 5,615,471 A and in the document DE 197 29 263 A1 do not provide this reliable detection of defective parts.

Until now, correct tapping has been detected, in each cycle, by verifying the lowermost position of the tap, to be sure that the tap has performed a stroke of sufficient length for it to be certain that it has passed through the part.

Thus a tap position detector is placed directly under the tapping tool, entirely within the platen of the tool, the detector sending electrical signals over a line to a control device.

A serious defect of these prior art detection devices is that in each case an appropriate device must be fitted under the tapping tool, and must conform to the normal stroke of the tap. Because the detector is not accessible, it is difficult or even impossible to adjust the stroke.

Another drawback is that the detection devices are bulky, i.e. they occupy a non-negligible space below the tapping tool, with the result that detectors may not be placed very close together when a plurality of parallel holes are to be tapped in the same product. Because of the necessary overall size of the detection device placed in the press support, it is impossible to execute closely spaced tappings.

Also, prior art devices are sensitive to the presence of tapping swarf, which affects the reliability of detection.

SUMMARY OF THE INVENTION

The problem addressed by the present invention is to design a new tap position sensor structure for tapping on a press, enabling use over a wide range of tapping options, and enabling adjustment of the detectors according to the required final position of the tap.

Another object of the invention is to provide a tap position sensor structure that is particularly reliable, and accurate, in order to detect defective parts with certainty and to reject them from the batch as soon as they are fabricated.

Another object of the invention is to provide a tap position sensor that is particularly compact, and easy to integrate into a tool platen under the tapping tool, to enable the execution of closely spaced tappings.

To achieve the above and other objects, the invention provides a tap position sensor for tapping on a press, comprising:

a feeler adapted to be integrated into a platen of a cutting tool and to be loaded by the end of the tap at the end of tapping, a displacement multiplier device, loaded by the feeler and adapted to amplify the displacement of the feeler, a transmission cable, coupled by a first end to the displacement multiplier device, and whose second end is offset away from the feeler, position detection means, adapted to detect the position of the second end of the transmission cable.

Thanks to the transmission cable, the above combination of features enables the position detection means to be moved out of the area occupied by the tap, avoiding possible measurement and detection errors that might be introduced by the necessary clearances of the mechanical transmission from the tap to the position detection means, and considerably facilitating the integration of the device into the tool platen area under the tapping tool.

The invention therefore proposes a solution of relatively low cost, using a detector having one portion that is placed in the lower cavity under the tap in the platen of the tool, to come into contact with the tap in order to identify accurately its bottom dead center position, and to transmit this information remotely to the exterior of the tool support in a manner that frees up the maximum space under the tap, enabling integration of a plurality of closely spaced taps and adjustment of the detectors.

The transmission cable may be bare, provided that it works in traction, remains taut, and slides between two end supports fastened to the frame of the device.

The transmission cable preferably slides in a sheath itself fastened to the frame of the device.

In one advantageous embodiment of the invention, the displacement multiplier device comprises a multiplier lever having an upstream arm shorter than the downstream arm.

The multiplier lever is preferably cranked and has a waiting position in which its upstream arm is in a horizontal orientation appropriate to detecting vertical movement of a tap and at least a portion of its downstream arm is in a vertical orientation appropriate to horizontal departure of the transmission cable. This facilitates integration of the device into the press support under the area occupied by the tapping tool.

In one embodiment, the feeler comprises a plunger adapted to move in vertical translation and functionally connected to the upstream arm of the multiplier lever by a transverse pin engaged with and adapted to move in longitudinal translation along the upstream arm of the multiplier lever.

In another embodiment, the feeler comprises a generally horizontal reversing lever pivoting about a horizontal median shaft and whose upstream end is loaded by the tap at the end of the tapping stroke and whose downstream end is coupled to the multiplier lever.

In a third embodiment the feeler comprises a vertical plunger fastened to the upstream arm which is substantially horizontal, and in line with the trajectory of the tap to be detected.

The multiplier lever is preferably spring-loaded into a waiting position by a spring. The spring constitutes the means for returning the feeler, the transmission cable and the position detection means to the waiting position.

A position sensor of the kind defined above may be integrated into an integrated cutting and tapping tool. In this kind of embodiment, the integrated cutting and tapping tool comprises two platens, a strip support for supporting a strip to be cut, tools for cutting the strip, and at least one tapping tool carrying a tap. The tool comprises at least one position sensor comprising a remote detector as defined hereinabove, with the feeler and the displacement multiplier device integrated into the bottom platen of the tool in the area below the tapping tool.

The transmission cable is preferably adapted to pass through the bottom platen of the tool from the area below the tapping tool to the exterior of the bottom platen of the tool, and the position detection means are placed outside the bottom platen of the tool where they are therefore directly accessible by the user.

BRIEF DESCRIPTION OF THE DRAWINGS

Other objects, features and advantages of the present invention will emerge from the following description of particular embodiments, which is given with reference to the appended drawings, in which.

DESCRIPTION OF THE PREFERRED EMBODIMENTS

Figure 1:
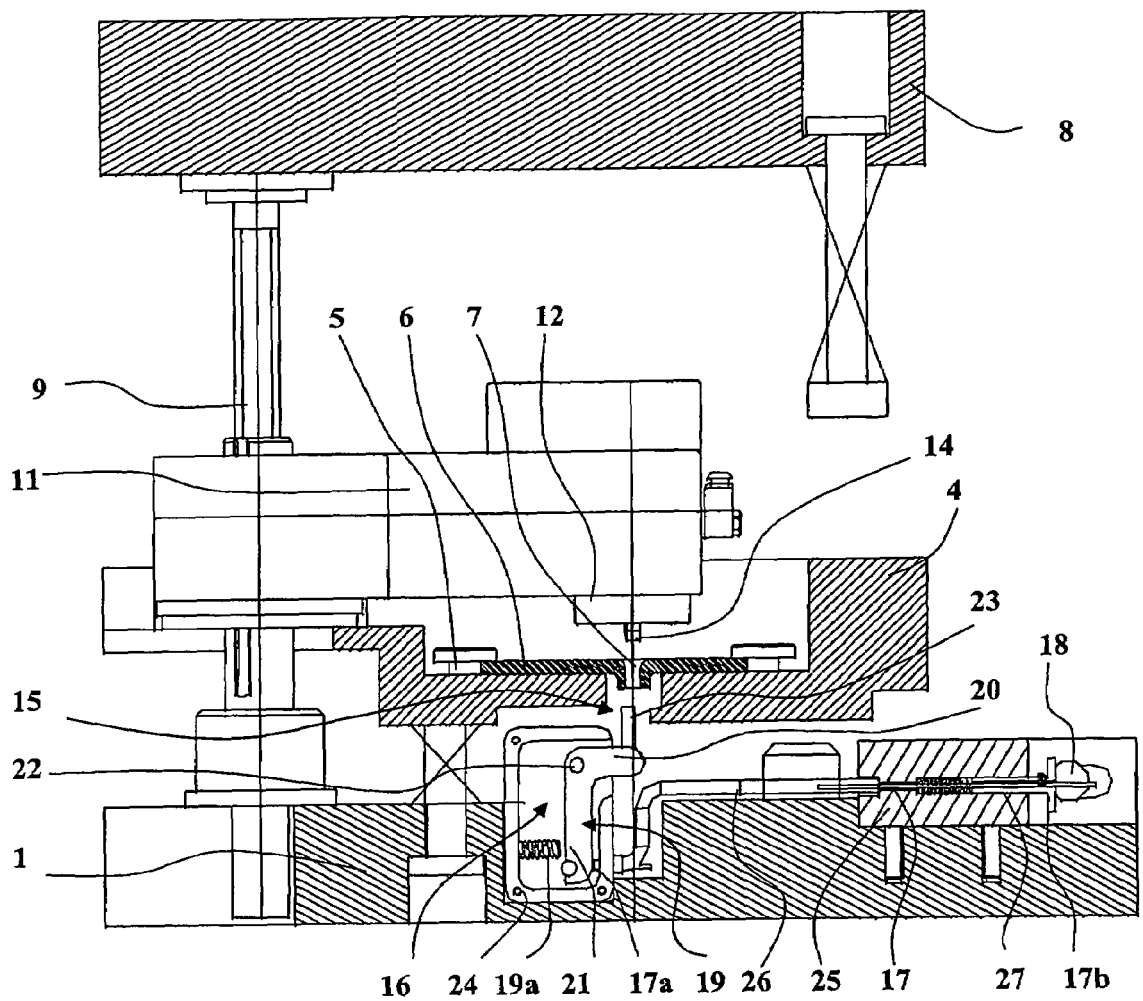
FIG. 1 is a diagrammatic side view in section of an integrated cutting and tapping tool provided with a tap position sensor conforming to a first embodiment of the invention, with the tool in a waiting position.

In the embodiments shown in the figures, the tap position sensor of the invention is shown in its position of use within an integrated cutting and tapping tool.

The integrated cutting and tapping tool comprises a bottom platen 1 and a top platen 8 supporting all of the other components.

The integrated cutting and tapping tool comprises a plurality of stations comprising cutting and shaping tools, not shown, and a station comprising the tapping tool 11, shown in FIGS. 1, 3, 4, 5, 6 and 7.

The material worked by this tool takes the form of a strip 6 fed horizontally under the tool on a strip support 4 which comprises guides 5 for holding it. The strip 6 has at least one hole 7 through it which is to be tapped. The hole may have been formed at a preceding station of the tool, for example.

This tool is mounted on a press. The bottom platen 1 rests on the table of the press and the top platen 8 is fixed to the slide of the press, which moves it vertically.

At the tapping station, this vertical movement is converted to a rotation movement by a screw/nut device 9. The resulting rotation movement is transmitted to the tapping tool 11, which in turn transmits a helicoidal movement to a tap carrier spindle 12. The tap carrier spindle 12 is conformed to carry a tap 14 placed opposite the hole 7 to be tapped.

In the waiting position shown in FIG. 1, the top platen 8 is raised and the tap 14 is away from the strip 6.

Figure 3:
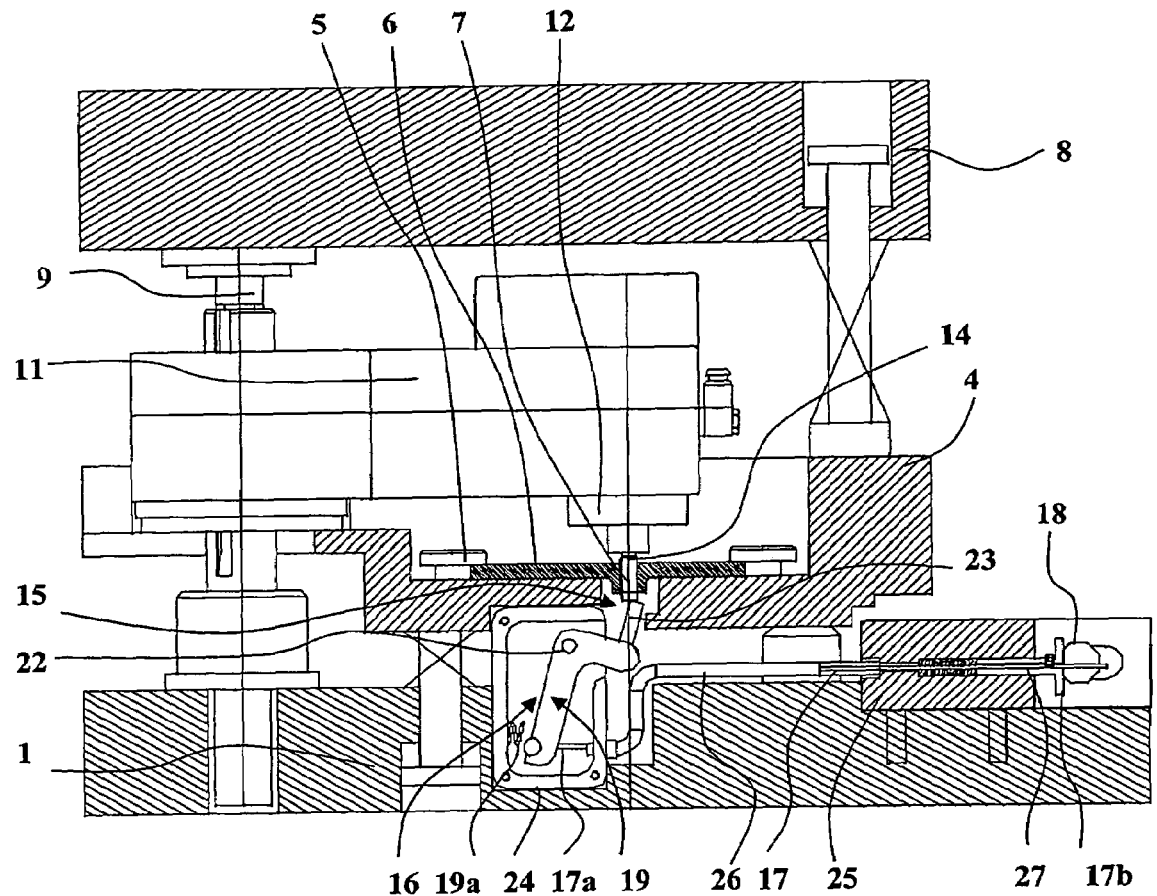
FIG. 3 is a side view in section of the integrated cutting and tapping tool from FIG. 1, with the tool in a tap bottom dead center point detection position.

At the bottom dead center point of the tap, shown in FIG. 3, the top platen 8 is lowered, and the tap carrier spindle 12 has performed a helicoidal movement, entraining in said movement the tap 14 which has passed through the hole 7 in the part 6. The distal end of the tap 14 projects slightly below the strip 6.

In certain tools, the strip support 4 may also be reciprocated in vertical translation to accompany the cutting and forming operations effected at the other stations of the tool. The tapping station is then adapted to this movement of the strip support 4. Thus, in the FIG. 1 waiting position, the strip support 4 is raised away from the bottom platen 1 whereas at the FIG. 3 bottom dead center point the strip support 4 is lowered and therefore closer to the bottom platen 1. This vertical movement of the strip support 4 does not affect the detection of the bottom dead center point of the tap 14 by the detection means of the invention.

In all embodiments, the tap position sensor essentially comprises a feeler 15, a displacement multiplier device 16, a transmission cable 17, and position detection means 18.

Also, in all the embodiments shown in the figures, the displacement multiplier device 16 comprises a multiplier lever 19 having an upstream arm 20 shorter than its downstream arm 21, and mounted to pivot about an intermediate horizontal transverse shaft 22 at the junction between the upstream arm 20 and the downstream arm 21. However, it may be assumed that multiplier lever structures articulated at one end may be used instead.

Figure 2:
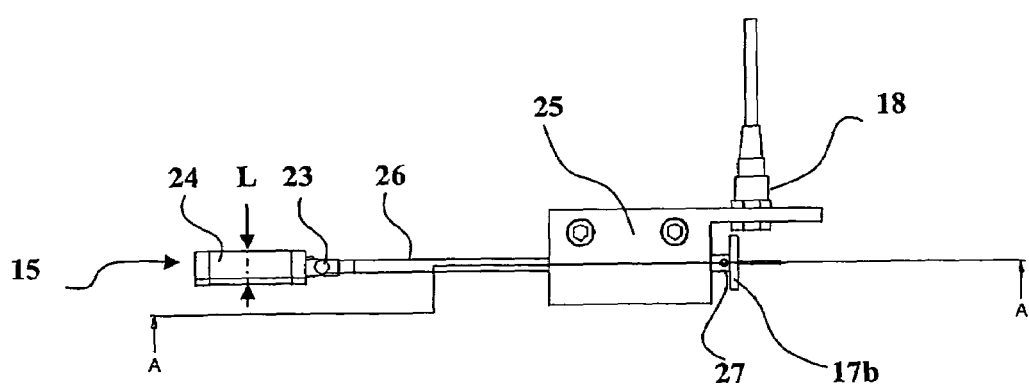
FIG. 2 is a diagrammatic plan view of the tap position sensor system from FIG. 1, showing the section line A—A used for the side views.

In the embodiment shown in FIGS. 1 to 3, the multiplier lever 19 is cranked and, in the waiting position shown in FIG. 1, its upstream arm 20 is horizontal and its downstream arm 21 is vertical. A spring 19a spring-loads the multiplier lever 19 toward its FIG. 1 waiting position, with the downstream arm 21 vertical and the upstream arm 20 horizontal. In this embodiment, the feeler 15 comprises a vertical plunger 23 fastened to the upstream arm 20 and in line with the trajectory of the tap 14 to be detected.

The feeler 15, integrated into the bottom platen 1 of the tool and into the strip support 4, is adapted to be loaded by the distal end of the tap 14 at the end of tapping.

The displacement multiplier device 16 is loaded by the feeler or vertical plunger 23 so that it pivots about the intermediate horizontal transverse shaft 22, and so that the different lengths of the upstream arm 20 and the downstream arm 21 amplify the displacement of the feeler or vertical plunger 23.

A first end 17a of the transmission cable 17 is connected to the displacement multiplier device 16. In practice, the first end 17a of the transmission cable 17 is fixed to the distal end of the downstream arm 21. Its second end 17b, which is away from the feeler 15, is detected by the position detection means 18.

The multiplier lever 19 and its spring 19a are mounted in a feeler body 24 fixed into the bottom platen 1 of the tool.

The transmission cable 17 allows the position detection means 18 to be offset outwards, away from the area of the tap 14, and the detection means 18 are fastened to a detector body 25 which is itself fixed to the bottom platen 1 of the tool.

The transmission cable 17 advantageously slides in a sheath 26 that is fixed relative to the bottom platen 1 of the tool.

For example, the position detection means 18 may comprise a proximity detector, responsive to the position of an end-piece 27 which slides in the detector body 25 and which constitutes the second end 17b of the transmission cable 17.

At the end of the tapping stroke, the tap 14 passes through the hole 7 and its end loads the vertical plunger 23 which tilts the multiplier lever 19 toward the inclined position shown in FIG. 3; the multiplier lever 19 pulls on the transmission cable 17, whose second end 17b is then detected by the position detection means 18, which confirms the presence of the tap 14 at the dead center point, thus confirming that the tapping that has been effected is of good quality.

Figure 4:
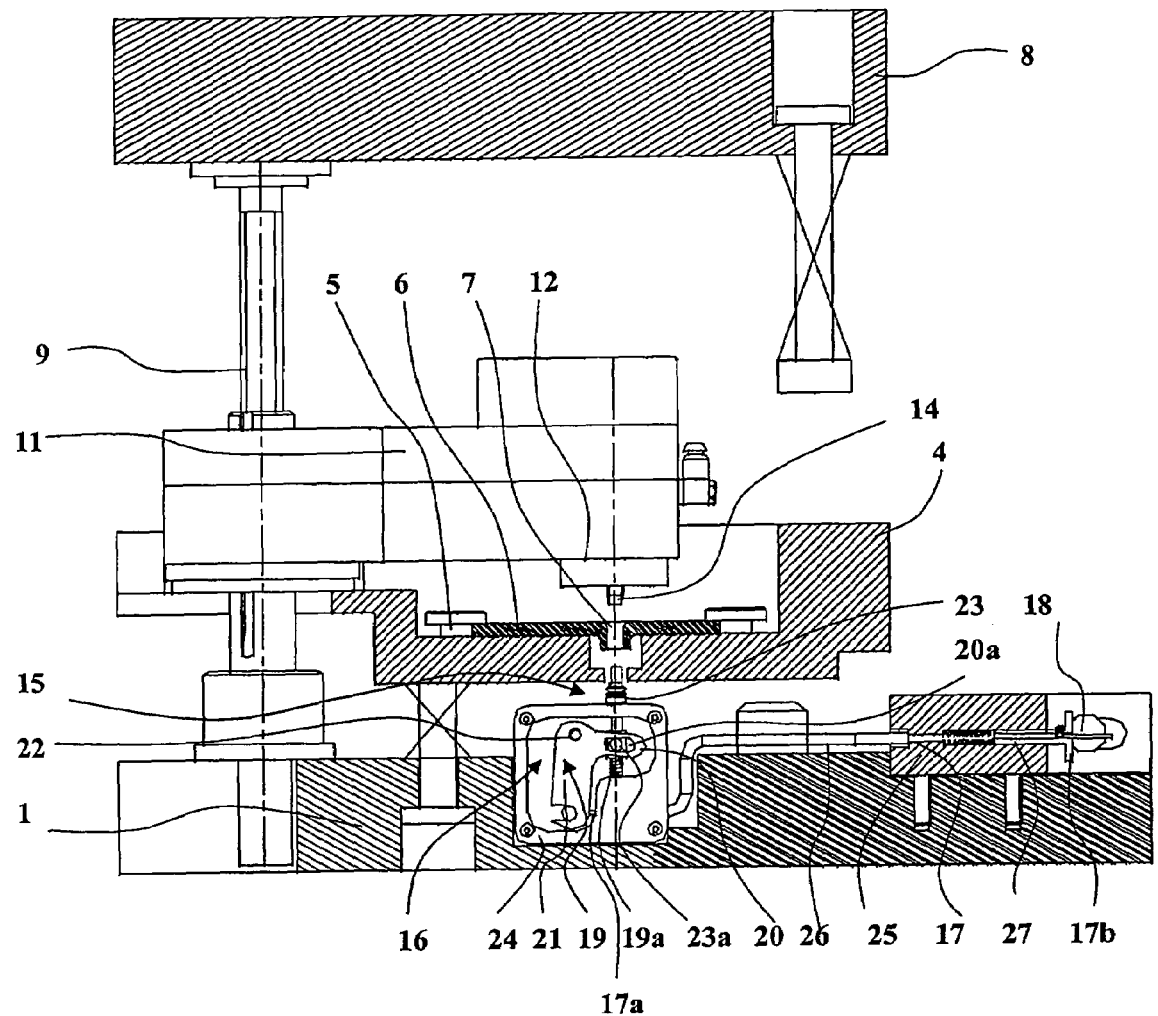
FIG. 4 is a side view in section of an integrated cutting and tapping tool provided with a tap position sensor conforming to a second embodiment of the present invention, with the tool in a waiting position.
Figure 5:
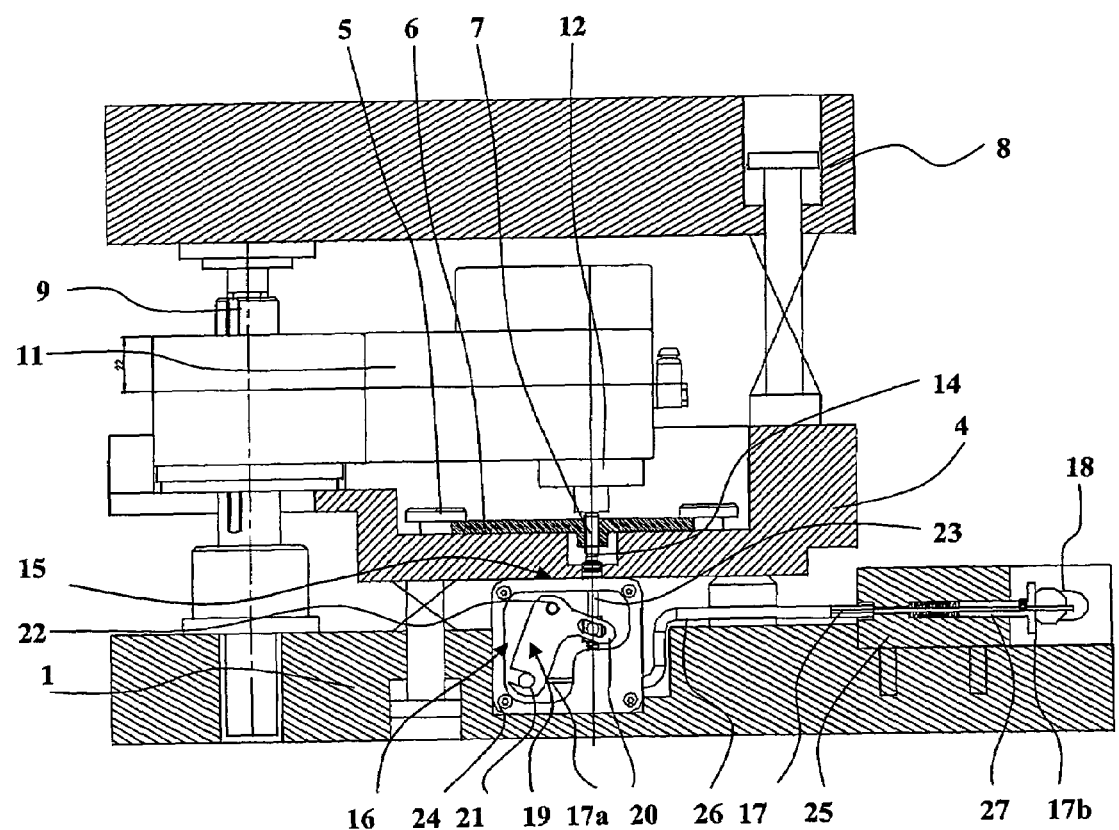
FIG. 5 shows the cutting tool from FIG. 4 in a tap bottom dead center point detection position.

The embodiment shown in FIGS. 4 and 5 comprises the same essential components as the integrated cutting and tapping tool from FIGS. 1 to 3, and these essential components are identified by the same reference numbers.

It also comprises the essential means of the tap position sensor, and in particular the feeler 15, the displacement multiplier device 16, the transmission cable 17, and the position detection means 18.

In this second embodiment, only the feeler 15 and the displacement multiplier device 16 are modified.

In this embodiment, there is also a feeler body 24 supporting a vertical plunger 23 constituting the feeler itself and associated with a multiplier lever 19 mounted to pivot about an intermediate horizontal transverse shaft 22, the multiplier lever 19 having two perpendicular levers, comprising a generally horizontal upstream arm 20 and a generally vertical downstream arm 21.

The vertical plunger 23 slides vertically in alignment with the vertical stroke of the tap 14, and is functionally connected to the upstream arm 20 by a transverse pin 23a on the vertical plunger 23, the transverse pin 23a being engaged in a horizontal oblong slot 20a in the upstream arm 20. This converts vertical translation movement of the vertical plunger 23 into rotation of the multiplier lever 19, which then loads in translation the transmission cable 17, movement of which is detected by the position detection means 18. FIGS. 4 and 5 respectively show the waiting position and the bottom dead center point position of the tap 14.

It should be noted that in this embodiment the spring 19a spring-loading the detector into the waiting position is mounted on the vertical plunger 23.

Figure 6:
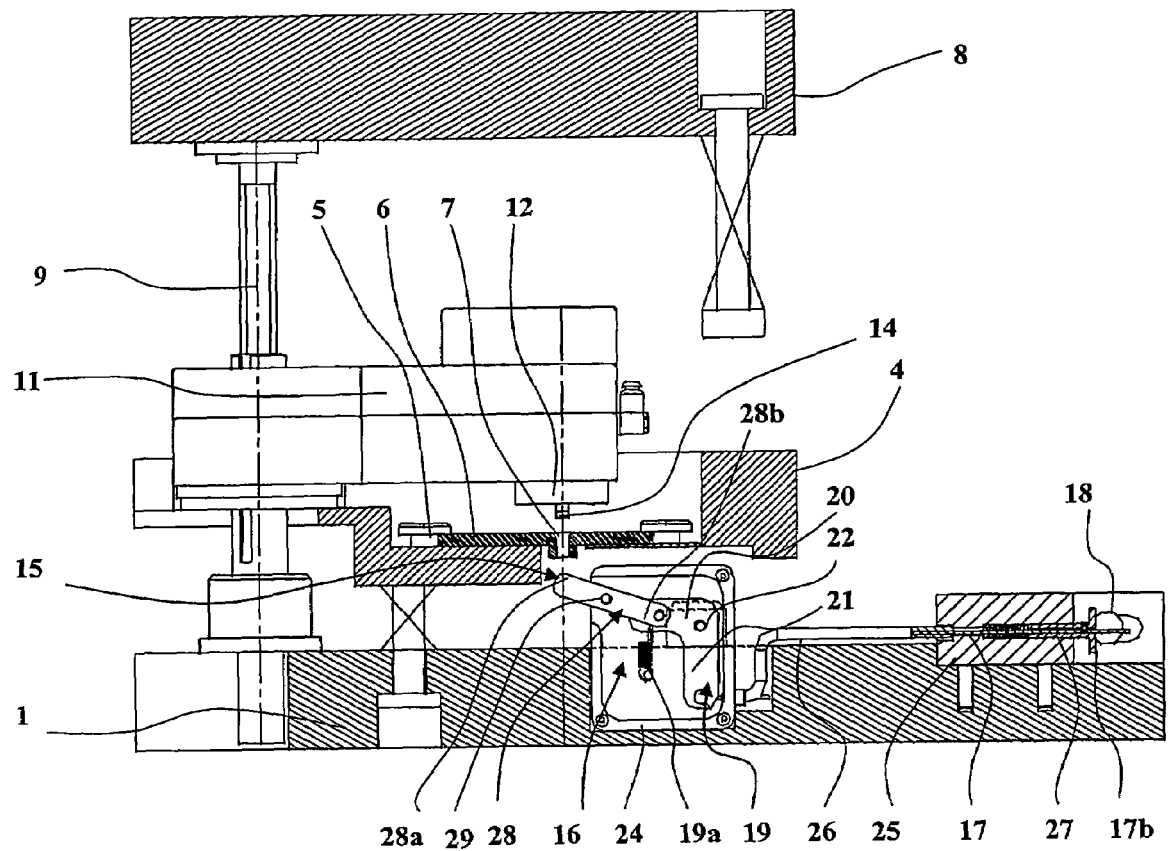
FIG. 6 is a side view in section of an integrated cutting and tapping tool provided with a tap position sensor conforming to a third embodiment of the present invention, with the tool in a waiting position.
Figure 7:
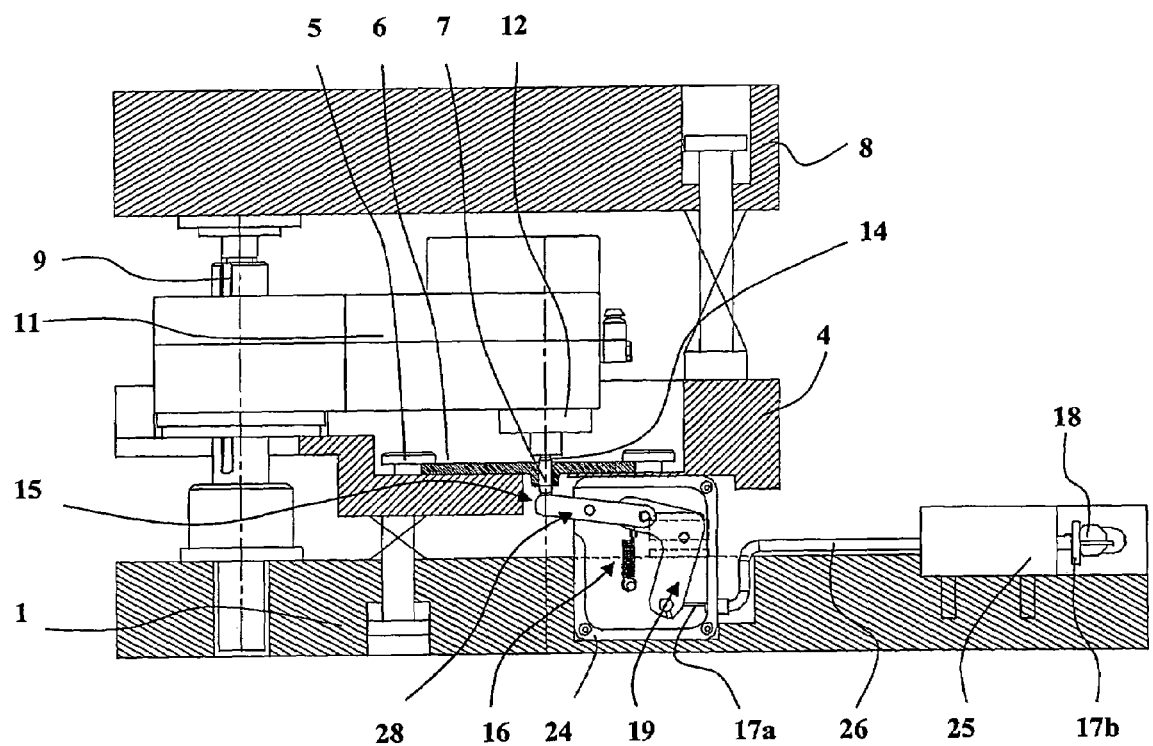
FIG. 7 is a side view in section of the tool from FIG. 6 in a tap bottom dead center point detection position.

The embodiment shown in FIGS. 6 to 7 also includes the essential means of the previous embodiments, and in particular the feeler body 24 carrying the feeler 15, the multiplier lever 19, and the return spring 19a, as well as a transmission cable 17 and position detection means 18.

In this embodiment, the feeler 15 comprises a generally horizontal reversing lever 28 pivoting about a horizontal median shaft 29. The upstream end 28a is loaded by the tap 14 at the end of the tapping stroke, and its downstream end 28b is coupled to the upstream end region of the upstream arm 20 of the multiplier lever 19. The position of the multiplier lever 19 is reversed compared to the position shown in FIGS. 1 to 4.

As may be seen in FIG. 2, the feeler body 24, that contains the feeler 15 and the displacement multiplier device 16, occupies a small width L under the tapping area 14. The width L is small because the multiplier lever pivots about a horizontal shaft 22 and is itself narrow. Likewise the reversing lever 28. It is therefore possible to place feeler bodies 24 close together to detect the position of taps that are themselves close together.

Also, because of the facility to move the other units such as the position detection means 18 away from the bottom platen 1, it is easy to integrate the subassembly comprising the feeler body 24 and the components that it contains into the bottom platen 1 of the tool.

Thanks to the structure according to the invention, it is possible to monitor efficiently the correct execution of each tapping operation. As a result, in the event of detection of an incomplete tapping, it is possible to reject the part at the fabrication stage, with the result that the batch of parts contains only satisfactory parts.

The present invention is not limited to the embodiments explicitly described and encompasses variants and generalizations thereof within the scope of the following claims.

The invention claimed is:

1. Tap position sensor for tapping on a press, comprising:
    a feeler adapted to be integrated into a platen of a cutting tool and to be loaded by the end of the tap at the end of tapping,
    a displacement multiplier device, loaded by the feeler and adapted to amplify the displacement of the feeler,
    a transmission cable, coupled by a first end to the displacement multiplier device, and whose second end is offset away from the feeler, and
    position detection means adapted to detect the position of the second end of the transmission cable.

2. Tap position sensor according to claim 1, wherein the transmission cable slides in a sheath.

3. Tap position sensor according to claim 1, wherein the displacement multiplier device comprises a multiplier lever having an upstream arm shorter than the downstream arm.

4. Tap position sensor according to claim 3, wherein the multiplier lever is cranked and has a waiting position in which its upstream arm is in a horizontal orientation appropriate to detect vertical movement of a tap and at least a portion of its downstream arm is in a vertical orientation appropriate to horizontal departure of the transmission cable.

5. Tap position sensor according to claim 3, wherein the feeler comprises a plunger adapted to move in vertical translation and functionally connected to the upstream arm of the multiplier lever by a transverse pin engaged with and adapted to move in longitudinal translation along the upstream arm of the multiplier lever.

6. Tap position sensor according to claim 3, wherein the feeler comprises a generally horizontal reversing lever pivoting about a horizontal median shaft and whose upstream end is loaded by the tap at the end of the tapping stroke and whose downstream end is coupled to the multiplier lever.

7. Tap position sensor according to claim 3, wherein the feeler comprises a vertical plunger, fastened to the upstream arm which is substantially horizontal, and in line with the trajectory of the tap to be detected.

8. Tap position sensor according to claim 3, wherein the multiplier lever is spring-loaded into a waiting position by a spring.

9. Integrated cutting and tapping tool, having a bottom platen, a top platen, a strip support for supporting a strip to be cut, tools for cutting the strip, and at least one tapping tool carrying a tap, and having at least one position sensor comprising a remote detector according to claim 1, with the feeler and the displacement multiplier device integrated into the bottom platen of the tool in the area below the tapping tool.

10. Integrated cutting and tapping tool according to claim 9, wherein the transmission cable is adapted to pass through the bottom platen of the tool from the area below the tapping tool to the exterior of the bottom platen of the tool and the position detection means are placed outside the bottom platen of the tool.

* * * * *